Dec. 1, 1953  A. L. BERGSTROM  2,660,840
CONE RIB FINISHING MACHINE
Filed March 16, 1950  2 Sheets-Sheet 1

INVENTOR:
Albert L. Bergstrom,
By Carr & Carr Gravely,
HIS ATTORNEYS.

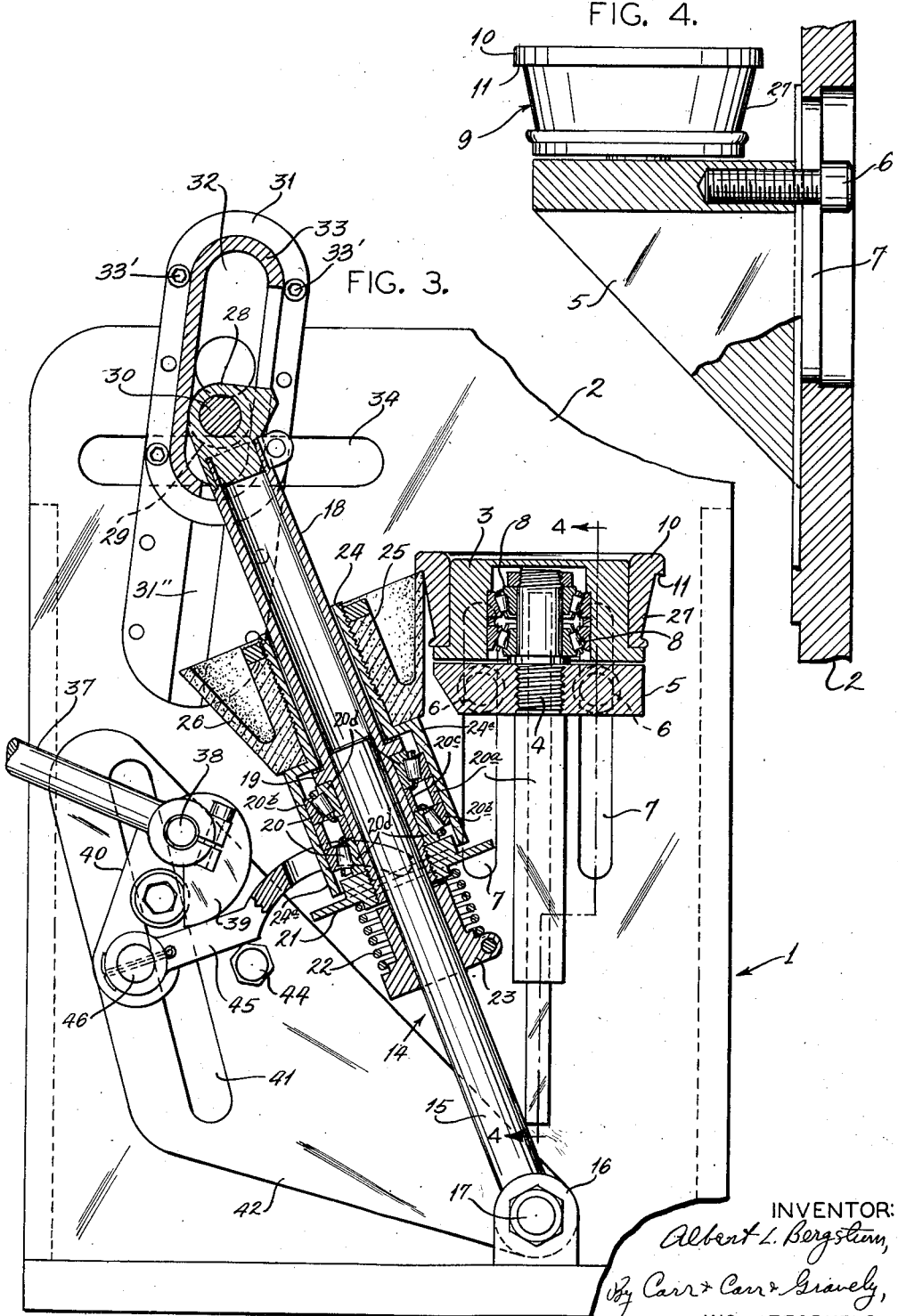

Patented Dec. 1, 1953

2,660,840

UNITED STATES PATENT OFFICE

2,660,840

CONE RIB FINISHING MACHINE

Albert L. Bergstrom, Canton, Ohio, assignor to The Timken Roller Bearing Company, Canton, Ohio, a corporation of Ohio Application March 16, 1950, Serial No. 149,996

9 Claims. (Cl. 51—131)

This invention relates to grinding machines and is more particularly directed to a machine for honing the rib thrust face of tapered roller type antifriction bearing cones.

The object of the invention is to provide a machine for honing the thrust face of an antifriction bearing cone rib to a radius equal to the apex length of the cone angle.

The invention consists in the provision of means for supporting a tapered roller bearing cone and a honing stone spindle pivotally supported with respect thereto on an axis disposed on the rotational axis of the bearing cone.

The invention also consists in the provision of means for adjusting the axis of the honing stone spindle with respect to the rotational axis of a work piece in order that various size bearing cones may be honed on the machine, said means being organized so that the honing stone spindle can be moved toward or away from the bearing cone.

The invention also consists in the parts and combinations and arrangements of parts hereinafter described and claimed.

In the drawings:

Fig. 3 is a sectional view taken substantially along the line 3—3 of Fig. 2; and Fig. 4 is a sectional view taken substantially along the line 4—4 of Fig. 3.

Figure 1:
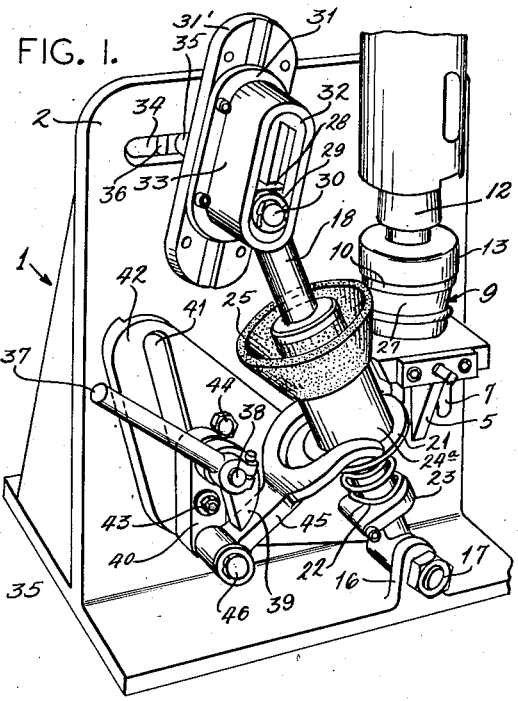
Fig. 1 is a perspective view of a machine embodying the invention.
Figure 2:
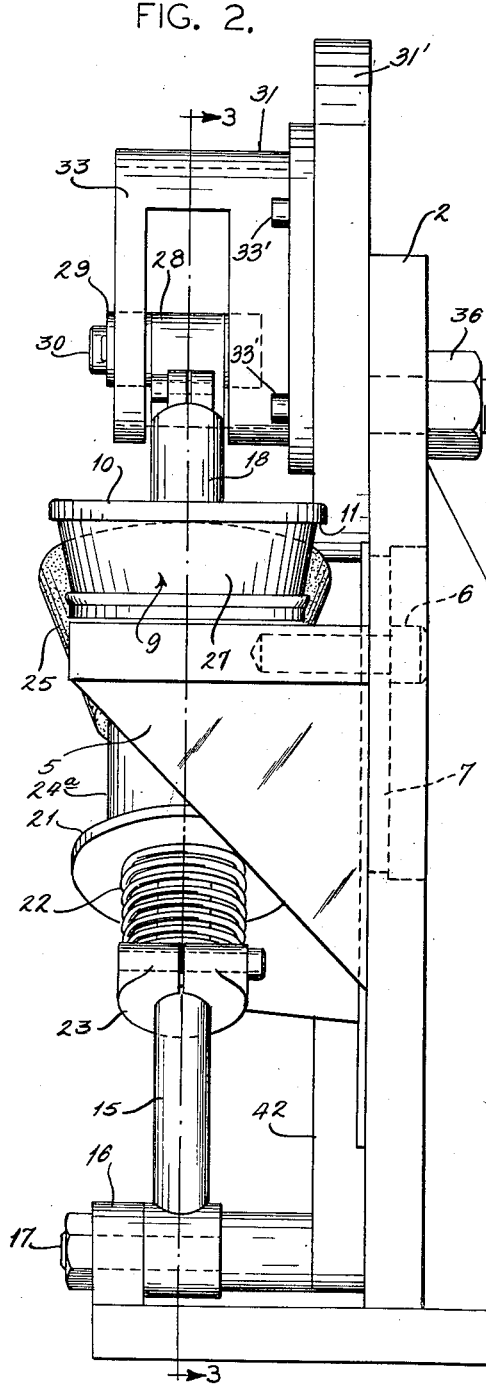
Fig. 2 is a side elevational view of a machine embodying the invention.

The invention is embodied in the structure set forth in the several views of the drawings in which the numeral 1 designates a frame mounted on the table of a machine tool (not shown) having a vertical wall 2. A work piece supporting arbor 3 is rotatably supported on a stud 4 adjustably mounted on the wall 2. The stud is secured to a bracket 5 into which lockscrews 6 are threaded that are received in slots 7 cut in wall 2, the lockscrews being vertically movable in the slots. A double row tapered roller bearing 8 is mounted on said stud and received in a suitable bore in the arbor 3.

The work piece 9 is a cone for an antifriction bearing of the tapered roller type and is mounted on the arbor 3. The large end of the cone is provided with a flange or rib 10 whose thrust face 11 is to be machined, the thrust face being normally engaged by tapered rollers in an assembled tapered roller bearing. A driver 13 secured to a machine tool spindle 12 engages the end of the cone for rotating same.

An extensible spindle indicated at 14, includes a rod or shaft 15 pivoted to a bracket 16 on the frame 1, by means of a pin 17. A second part of the extensible spindle 14 is the tubular member 18 slidably mounted on the rod or shaft 15. A collar 19 is formed on the tubular member 18 and tapered roller bearings 20 are mounted on the tubular member 18. A spacer ring 20a is interposed between the cups 20b and a spacer ring 20c is interposed between the cones 20d. One of these cones abuts a collar 19 and the other abuts a radial flanged nut 21 for clamping the bearing cones 20d in position. The radially flanged nut 21 is threaded on the tubular member and engaged by a spring 22 that also engages a spring retainer clamp 23 adjustably secured to the rod or shaft 15. A hollow spindle 24 is mounted over the tubular member 18 and has an enlarged portion 24a in which are mounted the cups 20b of the antifriction bearings 20. A honing stone 25 is secured to the spindle 24 in any convenient manner and is substantially cone-shaped. The honing stone is formed to provide an effective working portion 26, the end surface of which contacts the rib face 11 of the work piece.

The axis of pin 17 is aligned with the rotational axis of the arbor 3 and is at the apex of the tapered surface 27 of the work piece 9. The construction and adjustment described makes it possible to grind the thrust faces on cones of different diameter and different angles, thus obviating the necessity of providing a machine for each bearing size and taper thereof. The working surface of the honing stone 25 is dressed to a radius which is swung from the axis of the pin 17.

The end of the tubular member 18 remote from the pin 17 is provided with a fitting 28 on which a roller 29 is rotatably mounted. A pin 30 is secured in said fitting for rotatably supporting the roller 29. The roller 29 is slidably received in a roller guide 31 having an elongated slot 32 therein, the guide 31 having a flange 33 in which the slot is formed. A plate 31' is adjustably mounted on wall 2, the plate 31' being clamped to the wall 2 by means of a stud 35 extending through a slot 34 in wall 2 and on which is threaded a nut 36. The roller guide 31 is adjustably mounted on a plate 31' clamped to wall 2, as above described. The plate 31' is provided with a slot 31'' in which the roller guide 31 slides. The screws 33' clamp the roller guide to plate 31', the purpose of this adjustment being to further assist the stone 25 moving in the proper path relative to the arbor and the work piece held thereon. The roller guide 31 is laterally and rotatably adjustable relative to wall 2. The reason for the double adjustment is that various size work pieces can be machined on the arbor 3 without the necessity of rebuilding the machine. When the proper adjustment of the roller guide 31 has been effected, spring 22 will move the working portion 26 of the honing stone into engagement with face 11 and rotation of the spindle 12, which also rotates the work piece 9, will cause the face 11 to be honed.

Dressing and wear of the working surface of the honing stone 25 results in a decrease in the diameter of the stone. To correct for this change in diameter and to maintain the working surface of the stone properly located relative to the workpiece, the roller guide 31 is disposed at an angle relative to the axis of the arbor 3. Thus, any extension or upward movement of the tubular member 18, as occasioned by wear of the working surface of the stone 25, causes the roller 29 to move upwardly and toward the arbor 3 due to the pressure of the spring 22 on the flanged nut 21, thereby causing the stone 25 to move closer to the workpiece.

The honing stone 25 is disengaged from face 11 by operation of a lever 37 secured to a rotatably mounted pin 38 on which is secured a cam 39. This pin and cam are rotatably mounted in one end of a bar 40 adjustably mounted in a slot 41 in an adjusting plate 42 pivotally mounted on pin 17. A locking bolt 43 is provided in bar 40 that extends through slot 41 so that the bar may be adjustably mounted on plate 42. The adjusting plate 42 is locked to the wall 2 by means of a clamping screw 44. A forked lever 45 is pivoted to the other end of bar 40 by means of a pin 46. The dividend end of the forked lever 45 straddles the spindle 24 and is engageable with the flange on nut 21. When the lever 37 is actuated in a counter-clockwise direction, the cam 39 will depress the forked lever 45, thus compressing spring 22 and withdrawing the honing stone from the work piece, thereby enabling the finished work piece to be removed from the arbor and an unhoned work piece placed thereon. The several adjustments provided on wall 2 for the roller guide 31 and for the adjusting plate 42 and the bar 40, permit a wide variety of work pieces to be machined on the device. The vertical adjustment of the arbor 3 permits the thrust face 11 of different size bearing ribs to be machined about the axis of pin 17 so that all antifriction bearing cones will be cut or honed in the same manner.

The roller guide 31 and plate 31' are made up in two parts that are adjustable relative to each other, the holes in the plate 31' making the adjustment possible. The roller guide 31 in which the roller 29 operates is the vertically adjustable member, this adjustment being shown in Figs. 1 and 3. The initial adjustment is made by positioning bracket 5 at the correct height by the adjustment of the lockscrews 6 in slots 7 so that the apex of the cone will coincide with the axis of pin 17. The clamp 23 is then positioned so that the spring 22 will cause the abrasive wheel 25 to contact the work piece when the lever 37 is moved to the released position. The distance from the abrasive wheel 25 to the upper end of the extensible spindle remains constant. The roller guide 31 and the plate 31' are then adjusted relative to each other and relative to slot 34 so that the honing stone 25 will be located in the correct position relative to the work piece. The actuating mechanism on plate 42 is then adjusted so that when lever 37 is actuated, spring 22 will be compressed while the lever withdraws the cutting portion of the honing stone 25 from the work piece. When lever 37 is released, the spring will move the working surface of the stone 25 into engagement with the rib face 11, and, when the cone 9 is rotated by frictional engagement with the driver 13, the honing stone 25 will also be caused to rotate by friction and thereby generate the rib thrust face 11.

What I claim is:

1. A honing machine comprising a frame, a rotatable arbor adjustably mounted on said frame for holding a tapered tubular work piece provided with a radial flange, one face of which is to be machined, an extensible spindle, means on said frame for pivotally supporting one end of said spindle on said frame, a honing stone rotatably mounted on said spindle for machining said face on said work piece, a member adjustably mounted on said frame for supporting the free end of said spindle, a spring on said spindle for moving said honing stone into engagement with said flange face; and manually operable cam means adjustably mounted on said frame for disengaging said stone from said flange face against the action of the spring.

2. A honing machine comprising a frame, an arbor rotatably mounted on said frame for holding a work piece about the longitudinal rotational axis of the arbor, a rod and spindle assembly having one end thereof pivotally supported on said frame and movable toward and away from said arbor, the axis of pivoting of said assembly intersecting the longitudinal axis of the arbor, means for guiding the movement of the other end of said rod and spindle assembly, a honing stone mounted on said assembly and engageable with the work piece on the arbor, means mounted on said frame for adjusting the angle of said assembly with respect to the longitudinal axis of the arbor; and means including a cam and a spring engageable with said assembly for moving said spindle relative to the arbor.

3. A honing machine comprising a frame, a work piece supporting arbor rotatably mounted on said frame and rotatable about its longitudinal axis, an extensible honing stone spindle, means mounted on said frame for pivotally supporting one end of said spindle, the pivotal axis thereof intersecting the longitudinal axis of said arbor, means on said frame for adjustably supporting the other end of said spindle; and means including a cam and a spring for moving said spindle relative to said arbor.

4. A honing machine comprising a frame, an arbor adjustably mounted on said frame and adapted to receive a work piece, an extensible honing stone spindle, means pivotally mounted on said frame for supporting one end of said spindle, the pivotal axis thereof intersecting the longitudinal and rotational axis of said arbor, means adjustably mounted on said frame for supporting the other end of said spindle; and means including a cam and spring means engageable with said spindle for moving the spindle toward or away from said arbor.

5. A honing machine comprising a frame, an arbor rotatably mounted on said frame and adapted to hold a tapered tubular work piece provided with a radially projecting flange, a rod having one end thereof pivotally supported on said frame, the pivotal axis thereof intersecting the longitudinal and rotational axis of said arbor, a spindle having one end slidably supported on the other end of said rod, a honing stone on said spindle adapted for engagement with the radial flange on the work piece, means adjustably mounted on said frame for supporting the other end of said spindle, a cam and lever assembly adjustably mounted on said frame for moving said honing stone away from said arbor and out of engagement with said flange on the work piece; and yieldable means on said rod for moving said honing stone toward said arbor and into engagement with the flange.

6. A honing machine comprising a frame; a rotatable arbor adjustably mounted on said frame for holding a tapered tubular workpiece provided with a radial flange, one face of which is to be machined; an extensible spindle; means for pivotally supporting one end of said spindle on said frame; a honing stone rotatably mounted on said spindle for machining said face on said work piece; a member adjustably mounted on said frame for supporting the other end of said spindle; spring means on the spindle urging the honing stone into engagement with the flange face; and cam means for disengaging the honing stone from the flange face against the action of the spring means.

7. A honing machine, comprising a frame; a rotatable work-supporting arbor adjustably mounted on the frame for limited movement along its axis of rotation relative to the frame; a rod having one end thereof pivotally mounted on the frame, the pivotal axis thereof being intersected by the axis of rotation of the arbor; a spindle slidably mounted on the other end of the rod; an abrasive wheel rotatably mounted on the spindle; and a guide member receiving the end of the spindle opposite to the end disposed on the rod, the guide member being mounted on the frame for rotational and lateral adjustment relative thereto.

8. A honing machine, comprising a frame; a work-supporting arbor rotatably mounted on the frame; a rod having one end thereof pivotally mounted on the frame, the pivotal axis thereof being intersected by the axis of rotation of the arbor; a spindle slidably mounted on the other end of the rod for axial movement relative thereto; an abrasive wheel rotatably mounted on the spindle; and guide means on the frame receiving the end of the spindle opposite to the end supported on the rod, the guide means being inclined toward the axis of the arbor whereby axial movement of the spindle toward the guide means causes a pivotal movement of the rod carrying the spindle and abrasive wheel toward the arbor.

9. A honing machine, comprising a frame; a work-supporting arbor rotatably mounted on the frame; a rod having one end thereof pivotally mounted on the frame, the pivotal axis thereof being intersected by the axis of rotation of the arbor; a spindle slidably mounted on the other end of the rod for axial movement relative thereto; an abrasive wheel rotatably mounted on the spindle; guide means on the frame receiving the end of the spindle opposite to the end supported on the rod, the guide means being inclined toward the axis of the arbor whereby axial movement of the spindle toward the guide means causes a pivotal movement of the rod carrying the spindle and abrasive wheel toward the arbor; yieldable means urging the spindle away from the pivotal axis of the rod; and manually operable means for moving the spindle toward the pivotal axis of the rod.

ALBERT L. BERGSTROM.

References Cited in the file of this patent

UNITED STATES PATENTS

| Number | Name | Date |
|---|---|---|
| 468,535 | Mallon | Feb. 9, 1892 |
| 551,243 | Westphal | Dec. 10, 1895 |
| 681,440 | Clizbe | Aug. 27, 1901 |
| 952,866 | Baumgardner | Mar. 22, 1910 |
| 998,508 | Hattersley et al. | July 18, 1911 |
| 1,051,646 | Stukart | Jan. 28, 1913 |
| 1,171,174 | Corry | Feb. 8, 1916 |
| 1,199,836 | Sweet | Oct. 3, 1916 |
| 1,260,022 | Paige | Mar. 19, 1918 |
| 1,261,765 | Challet | Apr. 9, 1918 |
| 1,372,553 | Ryon et al. | Mar. 22, 1921 |
| 1,419,140 | Hutchinson | June 13, 1922 |
| 1,675,862 | Paige | July 3, 1928 |
| 1,878,066 | Van Berkel | Sept. 20, 1932 |
| 2,435,775 | French | Feb. 10, 1948 |

FOREIGN PATENTS

| Number | Country | Date |
|---|---|---|
| 463,675 | Great Britain | Apr. 5, 1937 |
| 639,894 | France | Mar. 17, 1928 |